(12) United States Patent
Lin

(10) Patent No.: US 11,669,138 B2
(45) Date of Patent: Jun. 6, 2023

(54) CHIP AND NEURAL NETWORK-BASED METHOD FOR ADJUSTING CURRENT

(71) Applicant: REALTEK SEMICONDUCTOR CORP., Hsinchu (TW)

(72) Inventor: Kuo-Chao Lin, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 386 days.

(21) Appl. No.: 16/878,113

(22) Filed: May 19, 2020

(65) Prior Publication Data

US 2021/0216127 A1    Jul. 15, 2021

(30) Foreign Application Priority Data

Jan. 10, 2020   (TW) .................................. 109101003

(51) Int. Cl.
| | |
|---|---|
| *G06F 1/00* | (2006.01) |
| *G06F 11/30* | (2006.01) |
| *G06F 1/28* | (2006.01) |
| *G06F 1/08* | (2006.01) |
| *G06N 3/08* | (2023.01) |
| *G06N 3/063* | (2023.01) |
| *G06F 1/30* | (2006.01) |

(52) U.S. Cl.
CPC .................. *G06F 1/28* (2013.01); *G06F 1/08* (2013.01); *G06F 1/305* (2013.01); *G06N 3/063* (2013.01); *G06N 3/08* (2013.01)

(58) Field of Classification Search
CPC ... G06F 1/28; G06F 1/08; G06F 1/305; G06F 1/30; G06N 3/063; G06N 3/08
See application file for complete search history.

(56) References Cited

U.S. PATENT DOCUMENTS

| | | | | |
|---|---|---|---|---|
| 5,272,723 A | * | 12/1993 | Kimoto ............. | H04L 25/03165 375/232 |
| 2005/0081073 A1 | * | 4/2005 | Williams .............. | G06F 9/3836 712/E9.032 |
| 2006/0053323 A1 | * | 3/2006 | Kissell .................... | G06F 21/81 713/300 |
| 2012/0151192 A1 | * | 6/2012 | Hsieh .................... | G06F 1/3237 712/E9.034 |

(Continued)

*Primary Examiner* — Xuxing Chen
(74) *Attorney, Agent, or Firm* — Birch, Stewart, Kolasch & Birch, LLP

(57) ABSTRACT

A chip includes an instruction storage unit, a processor core, an input circuit, a neural network circuit, power-consuming circuits, and a switch circuit. When the chip runs, the processor core performs a processing operation according to the instructions under being supplied with a current. At the same time, the neural network circuit predicts an upcoming change of the current according to data stream, representing the time-varying current, from the input circuit, and outputs a corresponding control signal. The switch circuit selectively provides a clock to one or more power-consuming circuits under the control of the control signal, so that each power-consuming circuit receiving the clock operates under being supplied with the current. Therefore, the chip can predict upcoming requirement of high electricity consumption, and duly start up a current wasting mechanism in advance, to avoid an excessive voltage drop without affecting operation efficiency of the processor core.

9 Claims, 2 Drawing Sheets

(56) References Cited

U.S. PATENT DOCUMENTS

2014/0115361 A1\* 4/2014 Martin ............... G06F 1/28 713/322
2014/0317422 A1\* 10/2014 Rosenzweig ......... G06F 1/324 713/300

\* cited by examiner

CHIP AND NEURAL NETWORK-BASED METHOD FOR ADJUSTING CURRENT

CROSS-REFERENCE TO RELATED APPLICATION

This non-provisional application claims priority under 35 U.S.C. § 119(a) to Patent Application No. 109101003 in Taiwan, R.O.C. on Jan. 10, 2020, the entire contents of which are hereby incorporated by reference.

BACKGROUND

Technical Field

The present invention relates to a chip and a neural network-based method for adjusting a current, and in particular, to a chip having a processor core.

Related Art

A system on a chip (SOC) is a chip that integrates a plurality of functional components, for example, a chip that integrates a central processing unit, a memory, a logic component, and an analog component.

When the SOC 'runs, the SOC is supplied with power from the outside, and then the SOC supplies power to internal components of the SOC. In an electronic loop, when a time-varying change of a current amount of a metal conductor occurs, the metal conductor may generate a back electromotive force (that is, a voltage) to resist the change of the current. This effect may cause a possibility of an instant drop of a supplied voltage. An abnormal circuit may be caused due to the instant drop of the voltage. For example, an external power supply supplies power to a digital signal processor (DSP) inside the SOC via a power supply path formed by metal conductors such as an external circuit wire, a chip pin, a bonding wire, and a power supply pad (a VDD Pad). All these metal conductors may have the foregoing induced electromotive force effect. Therefore, when an operation amount is instantly increased, the DSP may instantly extract a large amount of currents, and the DSP may be abnormal due to a voltage drop caused by an instant current difference. In particular, when the DSP instantly switches from a low operation amount to a high operation amount, this phenomenon may be especially obvious.

SUMMARY

In an embodiment, a chip is provided, which includes: an instruction storage unit, a processor core, an input circuit, a neural network circuit, a plurality of power-consuming circuits, and a switch circuit. The instruction storage unit is configured to store a plurality of instructions. The processor core is coupled to the instruction storage unit, and is configured to perform a processing operation under being supplied with a current. Herein, the processor core includes: a control circuit and an operation circuit. The control circuit is coupled to the instruction storage unit, and is configured to sequentially read the instructions. The operation circuit is coupled to the control circuit, and is configured to perform the processing operation according to the instructions read by the control circuit. The input circuit is configured to generate a data stream representing the time-varying current. The data stream includes a plurality of pieces of data, the pieces of data respectively correspond to the instructions, and each piece of data represents the current consumed when the processor core operates according to a corresponding instruction of the instructions. The neural network circuit is coupled to the input circuit, and the neural network circuit includes a plurality of functions and a plurality of parameters. Herein, the neural network circuit is configured to predict an upcoming change of the current according to the data stream, the functions and the parameters, and output a corresponding control signal. The switch circuit is coupled to the neural network circuit and the power-consuming circuits. The switch circuit is configured to selectively provide a clock to at least one power-consuming circuit under the control of the control signal, so that the power-consuming circuit receiving the clock performs the processing operation according to the clock under being supplied with the current.

In an embodiment, a neural network-based method for adjusting a current is provided, which includes: receiving a current as power for a processor core; sequentially reading, by the processor core, a plurality of instructions, and performing a processing operation according to the instructions read by a control circuit; generating a data stream representing the time-varying current; predicting, by a neural network circuit, an upcoming change of the current according to the data stream; and selectively enabling at least one of a plurality of power-consuming circuits according to the predicted upcoming change of the current. The data stream includes a plurality of pieces of data, the pieces of data respectively correspond to the instructions, and each piece of data represents the current consumed when the processor core operates according to a corresponding instruction of the instructions. Herein, the enabled power-consuming circuit supplies, according to the current, the power required for operation.

In conclusion, in the chip and the neural network-based method for adjusting a current in any of the embodiments, the neural network circuit can be used to predict that there will be a requirement of high electricity consumption according to an occupying degree of the processor core, so that a current wasting mechanism is started up, to avoid an excessive voltage drop without affecting operation efficiency of the processor core. In some embodiments, when it is predicted that there will be a requirement of high electricity consumption, the power-consuming circuits are enabled in stages to gradually increase the outside current received by the chip, to avoid an excessive instant current difference, thereby avoiding a sudden voltage drop.

DETAILED DESCRIPTION

Figure 1:
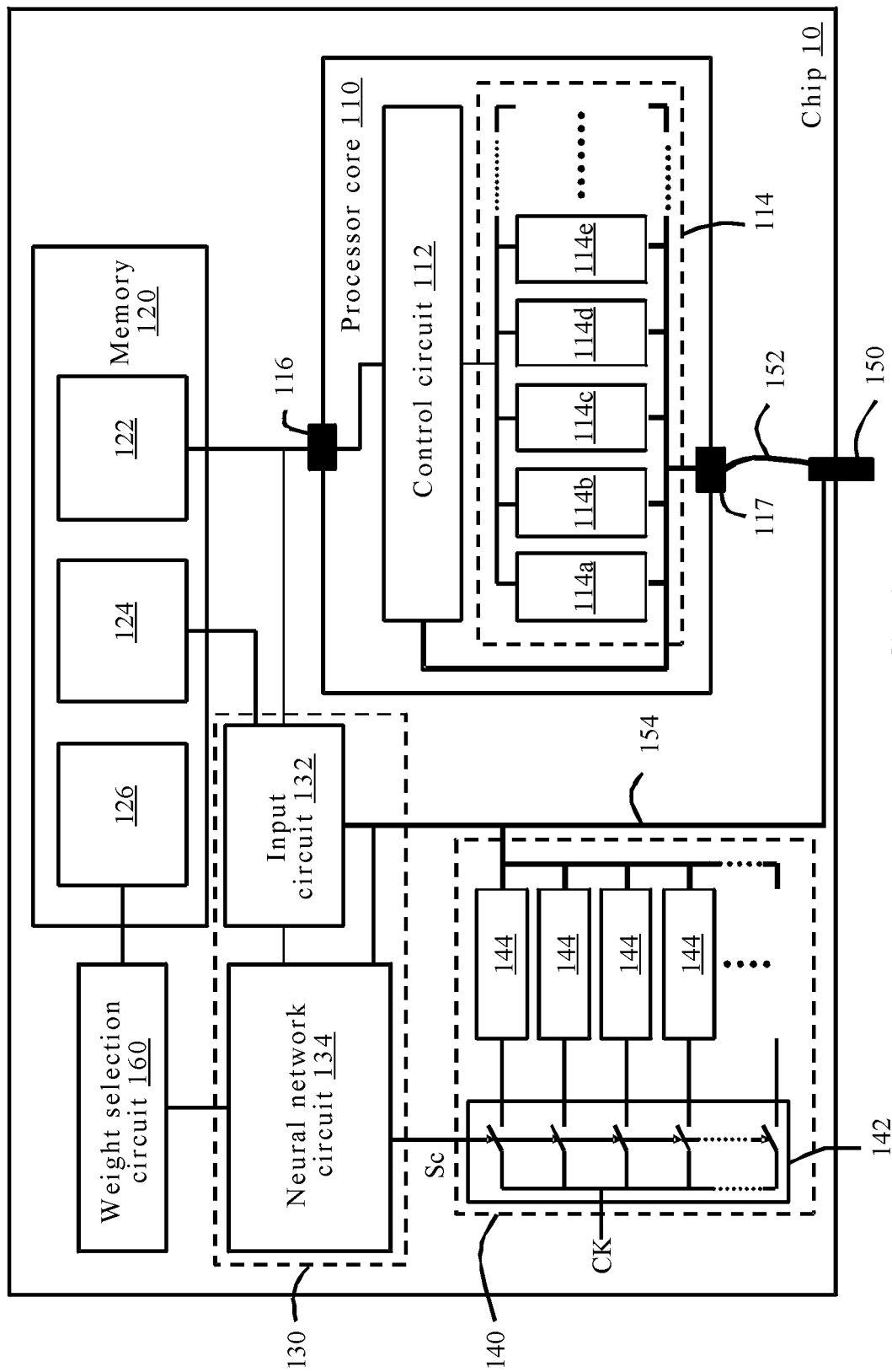
FIG. 1 is a schematic outline diagram of a chip according to an embodiment.

Referring to FIG. 1, in some embodiments, a chip 10 includes a processor core 110, an instruction storage unit 122, a current difference prediction unit 130, and a current wasting unit 140.

The processor core 110 is coupled to the instruction storage unit 122 and the current difference prediction unit 130. The current difference prediction unit 130 is coupled between the processor core 110 and the current wasting unit 140.

The processor core 110 includes: a control circuit 112 and an operation circuit 114. The control circuit 112 is coupled to the instruction storage unit 122 and the current difference prediction unit 130 outside the processor core 110 via an instruction pad 116 of the processor core 110. In addition, the control circuit 112 is further coupled to the operation circuit 114 inside the processor core 110.

The current difference prediction unit 130 includes an input circuit 132 and a neural network circuit 134. The input circuit 132 is coupled between the processor core 110 and the neural network circuit 134, and the neural network circuit 134 is coupled between the input circuit 132 and the current wasting unit 140. The neural network circuit 134 includes a plurality of functions and a plurality of parameters.

The current wasting unit 140 includes a switch circuit 142 and a plurality of power-consuming circuits 144. A control end of the switch circuit 142 is coupled to the neural network circuit 134. An input end of the switch circuit 142 is coupled to a clock. A plurality of output ends of the switch circuit 142 are respectively coupled to the power-consuming circuits 144. In some embodiments, each power-consuming circuit 144 may be a logic circuit formed by one or more logic gates.

The instruction storage unit 122 stores a plurality of instructions, for example, a storage instruction (Store), a load instruction (Load), a no operation instruction (NOP), an addition instruction (ADD), a subtraction instruction, a multiplication instruction, a division instruction, a multiply-accumulate instruction (such as an MAC 32 and MAC 64), and a float addition instruction (float ADD).

As shown in FIG. 1, when the chip 10 runs, the chip 10 is supplied with a current from the outside, to supply power for internal components of the chip 10. In FIG. 1, a power line is indicated by a bold line. It should be understood that, in FIG. 1, although an example in which the outside current received by the chip 10 is directly provided to the internal components is used, the present invention is not limited to the power supply manner. According to an actual requirement, the current received by the chip 10 may alternatively be provided to the internal components by using a voltage regulation circuit.

Figure 2:
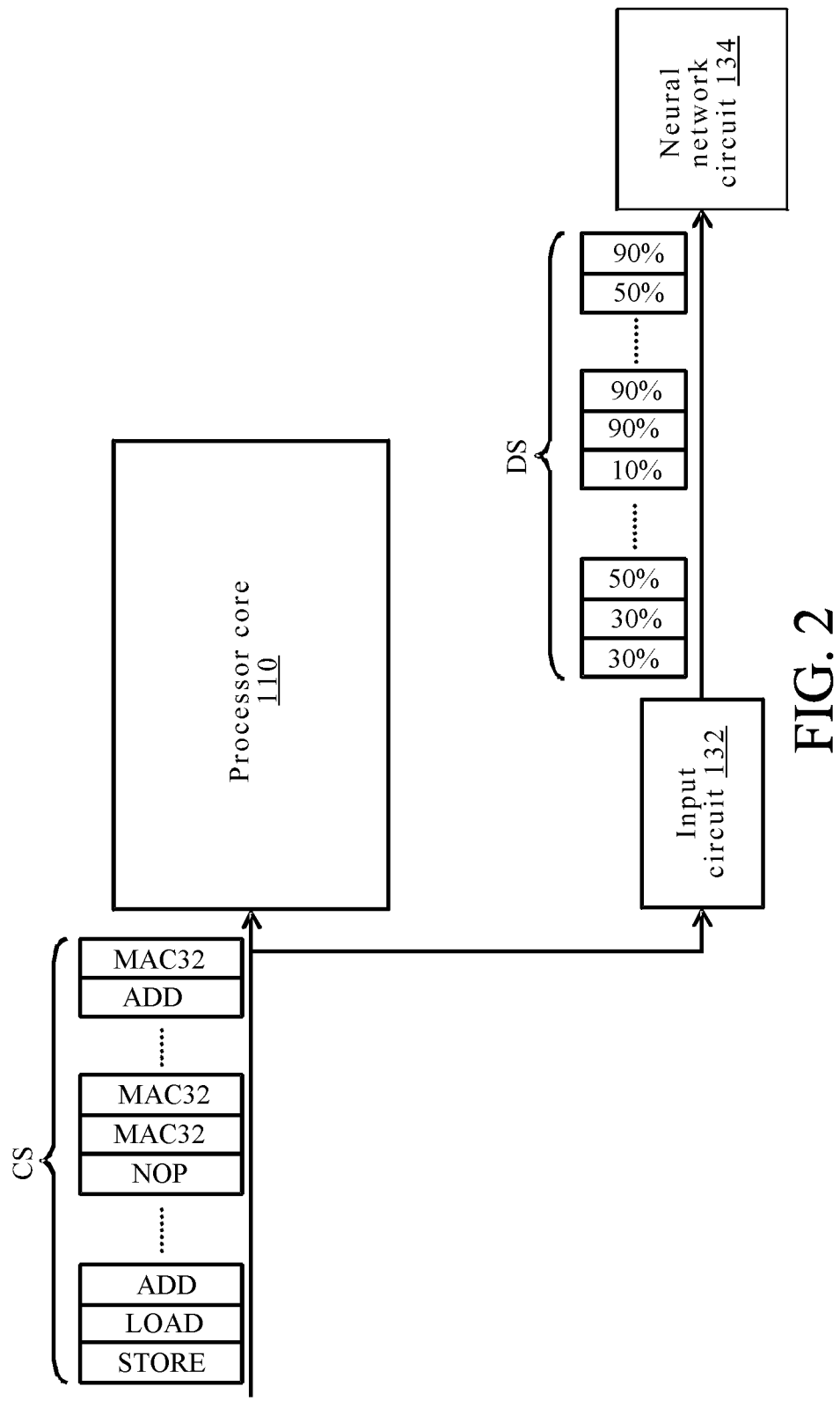
FIG. 2 is a schematic diagram of an example of a processor core and a current difference prediction unit in FIG. 1.

Herein, under being supplied with a current, the processor core 110 performs a processing operation, that is, performs a program. Referring to FIG. 1 and FIG. 2, when the processor core 110 performs the program, the control circuit 112 sequentially reads the instructions from the instruction storage unit 122, and controls the operation circuit 114, so that the operation circuit 114 performs the processing operation according to the instructions read by the control circuit 112.

When the processor core 110 performs the program, the input circuit 132 generates a data stream DS representing the time-varying current, so that the neural network circuit 134 performs a prediction mode based on the data stream DS. Herein, the data stream DS input to the neural network circuit 134 includes a plurality of pieces of data. The pieces of data respectively correspond to the instructions, and each piece of data represents the current consumed when the processor core 110 operates according to the corresponding instruction. In other words, each piece of data in the data stream DS input to the neural network circuit 134 is equivalent to the current consumed by the processor core 110 for executing the corresponding instruction. Moreover, the current that is currently consumed by the processor core 110 for executing instructions changes with time according to complexity and intensity of the instructions (that is, an operation amount of the processor core 110). Therefore, the data stream DS input to the neural network circuit 134 indicates a change of the current consumed by the processor core 110. For example, each piece of data in the data stream DS input to the neural network circuit 134 may be a normalized percentage of the current consumed by the processor core 110 when the corresponding instruction is executed compared with the current consumed by the processor core 110 when an instruction corresponding to a maximum consumption of the current is executed. In other words, the normalized percentage of the current consumed by the processor core 110 when the instruction corresponding to the maximum consumption of the current is executed is 100%. In an example, assuming that the instruction corresponding to the maximum consumption of the current is "MAC 64", and when the "MAC 64" is executed, the current consumed by the processor core 110 is 10 μW, which is the maximum current. The normalized percentage of the current corresponding to the MAC 64 is 100%. When the "ADD" is executed, the current consumed by the processor core 110 is 5 μW. Compared with the current consumed by the processor core 110 when the "MAC 64" is executed, the normalized percentage of the current corresponding to the "ADD" is 50%.

In the prediction mode of the neural network circuit 134, the neural network circuit 134 predicts an upcoming change of the current according to the input data stream DS, the functions of the neural network circuit 134, and the parameters of the neural network circuit 134, and outputs a control signal Sc corresponding to the upcoming change of the current to the control end of the switch circuit 142. Herein, the switch circuit 142 selectively enables at least one power-consuming circuit 144 according to the control signal Sc, that is, selectively supplies the at least one power-consuming circuit 144 with the clock under the control of the control signal Sc, so that each power-consuming circuit 144 receiving the clock operates according to the received clock under being supplied with the outside current.

In an embodiment, the input circuit 132 may include a lookup table circuit. The lookup table circuit is coupled between the processor core 110 and the neural network circuit 134. When the control circuit 112 reads the instructions from the instruction storage unit 122, the lookup table circuit may capture each instruction read by the control circuit 112, and perform table lookup according to each captured instruction, to convert the captured instruction into the corresponding piece of data. In other words, the chip 10 may further include a table storage unit 124, and the input circuit 132 is coupled to the table storage unit 124. The table storage unit 124 stores a comparison table (as shown in Table 1). The comparison table records current amounts consumed by the processor core 110 for executing various instructions (that is, the piece of data corresponding to the various instructions). The current amounts may be indicated by the normalized percentages of the consumed currents. In some embodiments, the current amounts of the various instructions may be obtained through simulation by a computer, to generate the comparison table in advance.

TABLE 1

| Instruction | Current amount |
| --- | --- |
| MAC 64 | 100% |
| MAC 32 | 90% |
| ADD | 50% |
| LOAD | 30% |

TABLE 1-continued

| Instruction | Current amount |
|---|---|
| STORE | 30% |
| NOP | 10% |

Before the processor core 110 performs the program, the lookup table circuit reads the comparison table from the instruction storage unit 122, and loads the comparison table to the lookup table circuit 122. Subsequently, while the lookup table circuit captures the instruction, the lookup table circuit may convert, according to the type of the captured instruction and the comparison table, the captured instruction into the corresponding current amount (that is, the piece of data) consumed by the processor core 110, and feeds back the converted current amount to the neural network circuit 134.

For example, an instruction string CS shown in FIG. 2 (that is, an implementation of the foregoing program) is used as an example. The operation circuit 114 may include a plurality of instruction processing units, for example, a load processing unit 114a, a storage processing unit 114b, an addition processing unit 114c, a multiply-accumulate processing unit 114d, and a float addition processing unit 114e. Each instruction processing unit is coupled to the control circuit 112 via an internal bus. The load processing unit 114a is configured to load input data according to the load instruction LOAD. The storage processing unit 114b is configured to store the input data to a data storage unit (not shown in the figure) according to the storage instruction STORE. The addition processing unit 114c is configured to perform an addition operation on the input data according to the addition instruction ADD. The multiply-accumulate processing unit 114d is configured to perform a multiplication and accumulation operation on the input data according to the multiply-accumulate instruction MAC 32. The float addition processing unit 114e is configured to perform a float addition operation on the input data according to the float addition instruction.

When the processor core 110 performs the program, the control circuit 112 reads the first instruction (that is, the multiply-accumulate instruction MAC 32) in the instruction string CS from the instruction storage unit 122, and controls the multiply-accumulate processing unit 114d to perform the multiplication and accumulation operation on the input data according to the multiply-accumulate instruction MAC 32. In this case, the lookup table circuit (that is, the input circuit 132) captures the multiply-accumulate instruction MAC 32 and looks up in the comparison table shown in Table 1 according to the multiply-accumulate instruction MAC 32, to obtain the corresponding piece of data (that is, "90%") and feed the piece of data to the neural network circuit 134. Next, the control circuit 112 reads the second instruction (that is, the addition instruction ADD) in the instruction string CS from the instruction storage unit 122, and controls the addition processing unit 114c to perform the addition operation on the input data according to the addition instruction ADD. In this case, the lookup table circuit captures the multiply-accumulate instruction MAC 32 and looks up in the comparison table shown in Table 1 according to the addition instruction ADD, to obtain the corresponding piece of data (that is, "50%") and feed the piece of data to the neural network circuit 134. The rest may be deduced by analogy until the execution of the last instruction (that is, the storage instruction STORE) in the instruction string CS is completed.

In other words, when the processor core 110 executes the instruction string CS, the input circuit 132 may also sequentially capture the instructions in the instruction string CS, and convert the instructions into the corresponding pieces of data, so that the input circuit 132 feeds the data stream DS corresponding to the instruction string CS to the neural network circuit 134.

In some embodiments, the functions of the neural network circuit 134 may be implemented through a long short-term memory (LSTM) algorithm. Herein, a time step of the input of the neural network circuit 134 is a first amount of pieces of data. The first amount may be a positive integer, for example, 50, 100, 200, 300, or more. In other words, the current difference prediction unit 130 may predict an upcoming change of the current during a predetermined period based on the first amount of instructions that has been performed or that is being performed by the processor core 110, that is, the change of the current consumed when the processor core 110 sequentially executes a second amount of instructions. The second amount may be a positive integer, for example, 1, 2, 3, 4, 5, . . . , 10, or more. For example, the current difference prediction unit 130 may predict a change of the current consumed when the processor core 110 will sequentially execute 5 instructions (that is, the $101^{st}$ to the $105^{th}$ instructions) based on 100 instructions that have been executed or is being executed by the processor core 110. In some embodiments, the second amount may be less than the first amount.

In some embodiments, when the neural network circuit 134 predicts that the upcoming change of the current is that an upcoming increasing amount of the current in a predetermined time is greater than a predetermined threshold (that is, it indicates that there will be a high instant current difference), the neural network circuit 134 outputs the control signal Sc, indicating providing the clock CK, to the switch circuit 142, so that the switch circuit 142 provides the clock CK to one or more power-consuming circuits 144 in stages under the control of the control signal Sc. In other words, corresponding to the data stream DS representing the time-varying current, the control signal Sc is time-varying.

In an example, the control signal Sc may be 0 to N orders. N is a positive integer and is equal to a total quantity of the power-consuming circuits 144. The switch circuit 142 includes a plurality of switches, and these switches separately correspond to the power-consuming circuits 144. Herein, a quantity of the switches is equal to a quantity of the power-consuming circuits 144. Each switch is coupled between the clock CK and a corresponding power-consuming circuit 144, and is controlled by the control signal Sc. That is, a control end of the switch is coupled to an output of the neural network circuit 134. When the neural network circuit 134 predicts that the upcoming change of the current is that an upcoming increasing amount of the current in a predetermined time is not greater than a predetermined threshold (that is, it indicates that an operation program of an instruction that is to be performed may not cause a high instant current difference), the neural network circuit 134 outputs the control signal Sc of "0 order". In this case, the switches of the switch circuit 142 are in a full off state under the control of the control signal Sc of "0 order", so that the clock CK is not connected to all the power-consuming circuits 144. When the neural network circuit 134 predicts that the upcoming change of the current is that the upcoming increasing amount of the current in the predetermined time is greater than the predetermined threshold (that is, it indicates that there will be a high instant current difference), the control signal Sc output by the neural network circuit 134 gradually changes from "1 order" to "N orders". In this case, the switches of the switch circuit 142 are gradually switched to an on state under the control of the control signal Sc, so that the clock CK is gradually provided to the power-consuming circuits 144. In other words, when the control signal Sc is "1 order", the switch circuit 142 provides the clock CK to one power-consuming circuit 144 to be turned on, and the remaining power-consuming circuits 144 are turned off. When the control signal Sc is "2 orders", the switch circuit 142 provides the clock CK to two power-consuming circuits 144 to be turned on, and the remaining power-consuming circuits 144 are turned off. When the control signal Sc is "3 orders", the switch circuit 142 provides the clock CK to three power-consuming circuits 144 to be turned on, and the remaining power-consuming circuits 144 are turned off. The rest may be deduced by analogy until when the control signal Sc is "N orders", the switches of the switch circuit 142 are in a full on state, to provide the clock CK to all the power-consuming circuits 144, that is, all the power-consuming circuits 144 are turned on. In some embodiments, when the control signal Sc output by the neural network circuit 134 gradually changes from "1 order" to "N orders", if the neural network circuit 134 predicts that the upcoming change of the current is that the upcoming increasing amount of the current in the predetermined time is not greater than the predetermined threshold, the neural network circuit 134 changes to output the control signal Sc that is "0 order".

In this embodiment, the chip 10 may further include a power supply pin 150 and a power supply line 152. The power supply line 152 is coupled between the power supply pin 150 and a power supply pad 117 of the processor core 110. When the chip 10 runs, the power supply pin 150 receives the current from the outside of the chip 10, and the current flows to the processor core 110 via the power supply line 152. In some embodiments, the power supply line 152 may be a bonding wire.

In some embodiments, the chip 10 may further include another power supply line 154. The power supply line 154 is coupled between the power supply pin 150 and the current difference prediction unit 130, and coupled between the power supply pin 150 and the current wasting unit 140. When the chip 10 runs, the power supply pin 150 receives the current from the outside of the chip 10, and the current flows to the current wasting unit 140 via the power supply line 154. Moreover, when the neural network circuit 134 predicts that there will be a high instant current difference, with enabling of the power-consuming circuits 144 (that is, the clock CK is received and the clock CK is used to perform the processing operation), the enabled power-consuming circuits 144 are also supplied with power via the power supply line 154 by the current received by the power supply pin 150, so that the outside current received by the chip 10 begins to gradually rise, with stage enabling of the power-consuming circuits 144, before an instruction with a high operation amount is performed. In some embodiments, the power supply line 154 may be a trace or a combination of the trace and the bonding wire.

In some embodiments, the chip 10 may further include a weight selection circuit 160 and a weight storage unit 126. The weight selection circuit 160 is coupled to the weight storage unit 126 and the neural network circuit 134. The weight selection circuit 160 stores a plurality of weight combinations. Each weight combination corresponds to operation information of the processor core 110. In an example, assuming that the functions of the neural network circuit 134 are implemented through an LSTM algorithm, these weight combinations are parameters that are obtained after the neural network circuit 134 performs training by using different time steps of the input which respectively correspond to parameters operation information of the processor core 110. In other words, under a training mode of the neural network circuit 134, the neural network circuit 134 performs training according to the data stream DS of an time step of the input, the functions, and the control signal Sc corresponding to the data stream DS, to adjust a weight (that is, the parameter) corresponding to each neuron of the neural network circuit 134. After the training is performed by using the data stream DS of each time step and the control signal Sc corresponding to the data stream DS, the values of the weights of the neural network circuit 134 and the distribution state of the weights may be recorded as a weight combination, and the weight combination corresponding to each time step may be store in the weight storage unit 126.

Before the processor core 110 performs the program, the weight selection circuit 160 may select, according to the current operation information of the processor core 110, a weight combination corresponding to the current operation information from the weight combinations stored in the weight storage unit 126, and set the parameters of the neural network circuit 134 according to the selected weight combination, that is, set the weight of each neuron, so that the neural network circuit 134 performs the prediction mode according to the selected weight combination. In order words, the prediction mode is implemented by the functions and the parameters set with the selected weight combination.

In some embodiments, the operation information may be specification information of the input data that is to be processed by the processor core 110 (such as a bit rate and/or a bit width), and/or may be an application field of the processor core 110.

In some embodiments, the instruction storage unit 122, the table storage unit 124, the data storage unit, and the weight storage unit 126 may be implemented by one or more memories 120.

In some embodiments, the current difference prediction unit 130 and/or the current wasting unit 140 may be implemented by another processor core. In some embodiments, the current difference prediction unit 130 and/or the current wasting unit 140 may also be functional circuits that are directly formed on a carrier of the chip.

In conclusion, in the chip and the neural network-based method for adjusting a current in any of the embodiments, the neural network circuit 134 can be used to predict that there will be a requirement of high electricity consumption according to an occupying degree of the processor core 110, so that a current wasting mechanism is started up, to avoid an excessive voltage drop without affecting operation efficiency of the processor core 110. In some embodiments, when it is predicted that there will be a requirement of high electricity consumption, the power-consuming circuits 144 are enabled in stages to gradually increase the outside current received by the chip 10, to avoid an excessive instant current difference, thereby avoiding a sudden voltage drop.

What is claimed is:
1. A chip, comprising:
an instruction storage unit, configured to store a plurality of instructions;
a processor core, coupled to the instruction storage unit, and configured to perform a processing operation under being supplied with a current, wherein the processor core comprises:

a control circuit, coupled to the instruction storage unit, and configured to sequentially read the plurality of instructions; and an operation circuit, coupled to the control circuit, and configured to executes the plurality of instructions read by the control circuit;

a lookup table circuit, coupled between the processor core and the neural network circuit, and configured to capture each the instruction read by the control circuit, search a piece of data corresponding to each the captured instruction in a lookup table, and then output a data stream representing the time-varying current, wherein the data stream comprises a plurality of pieces of data respectively corresponding to the plurality of instructions, and each the pieces of data represents a current consumed when the processor core operates according to the instruction corresponding to the piece of data;

a neural network circuit, coupled to the lookup table circuit, wherein the neural network circuit comprises a plurality of functions and a plurality of parameters, and the neural network circuit is configured to predict an upcoming change of the current according to the data stream, the plurality of functions and the plurality of parameters, and output a corresponding control signal;

a plurality of power-consuming circuits; and a switch circuit, coupled to the neural network circuit and the plurality of power-consuming circuits, and configured to selectively provide a clock to at least one of the plurality of power-consuming circuits under the control of the control signal, so that the at least one power-consuming circuit receiving the clock operates according to the clock under being supplied with the current.

2. The chip according to claim 1, further comprising:

a weight storage unit, configured to store a plurality of weight combinations, wherein each the weight combination corresponds to operation information of the processor core; and a weight selection circuit, coupled to the weight storage unit and the neural network circuit, and configured to select a weight combination form the plurality of weight combinations according to the current operation information of the processor core, and set the plurality of parameters of the neural network circuit according to the selected weight combination.

3. The chip according to claim 1, further comprising:

a power supply pin, configured to receive the current from the outside of the chip; and a power supply line, coupled between the power supply pin and the processor core.

4. The chip according to claim 3, wherein the power supply line is a bonding wire.

5. The chip according to claim 1, wherein when the neural network circuit predicts that the upcoming change of the current is that an upcoming increasing amount of the current in a predetermined time is greater than a predetermined threshold, the switch circuit provides the clock to the plurality of power-consuming circuits in stages under the control of the control signal.

6. A neural network-based method for adjusting a current, comprising:

receiving a current as power for a processor core;

sequentially reading, by the processor core, a plurality of instructions, and performing, by the processor core, a processing operation according to the plurality of instructions read by a control circuit;

generating a data stream representing the time-varying current, wherein the data stream comprises a plurality of pieces of data, the plurality of pieces of data respectively correspond to the plurality of instructions, and each the piece of data represents the current consumed when the processor core operates according to a corresponding instruction of the plurality of instructions;

predicting, by a neural network circuit, an upcoming change of the current according to the data stream; and selectively enabling at least one of a plurality of power-consuming circuits according to the predicted upcoming change of the current, wherein the enabled power-consuming circuit is supplied with the current.

7. The neural network-based method for adjusting a current according to claim 6, wherein the step of generating a data stream representing the time-varying current comprises:

capturing each the instruction read by the processor core, and performing table lookup according to each the captured instruction, to convert each the captured instruction into a corresponding piece of data of the plurality of pieces of data.

8. The neural network-based method for adjusting a current according to claim 6, further comprising:

selecting one weight combination from a plurality of weight combinations according to current operation information of the processor core; and setting a plurality of parameters of the neural network circuit according to the selected weight combination.

9. The neural network-based method for adjusting a current according to claim 6, wherein the step of selectively enabling at least one of a plurality of power-consuming circuits according to the predicted upcoming change of the current comprises: when the predicted upcoming change of the current is that an upcoming increasing amount of the current in a predetermined time is greater than a predetermined threshold, providing a clock to the plurality of power-consuming circuits in stages.

* * * * *